United States Patent
Josefsson

(10) Patent No.: US 9,337,722 B2
(45) Date of Patent: May 10, 2016

(54) FAST POWER-UP BIAS VOLTAGE CIRCUIT

(75) Inventor: Olafur Mar Josefsson, Hafnarfjordur (IS)

(73) Assignee: INVENSENSE, INC., San Jose, CA (US)

( * ) Notice: Subject to any disclaimer, the term of this patent is extended or adjusted under 35 U.S.C. 154(b) by 661 days.

(21) Appl. No.: 13/359,946

(22) Filed: Jan. 27, 2012

(65) Prior Publication Data

US 2013/0195291 A1 Aug. 1, 2013

(51) Int. Cl.
| | |
|---|---|
| *H04B 15/00* | (2006.01) |
| *H02M 3/07* | (2006.01) |
| *H02M 1/12* | (2006.01) |
| *H04R 3/00* | (2006.01) |
| *H04R 19/00* | (2006.01) |

(52) U.S. Cl.
CPC *H02M 3/07* (2013.01); *H02M 1/12* (2013.01); *H04R 3/007* (2013.01); *H04R 19/005* (2013.01); *H04R 2410/03* (2013.01)

(58) Field of Classification Search
CPC .. H04R 19/016; H04R 19/04; H04R 2410/03; H03F 2200/27; H03F 2200/546; H03F 2200/555; H03F 2203/45541; H03F 2200/03; H03F 3/181
USPC ........................................................ 381/94.5
See application file for complete search history.

(56) References Cited

U.S. PATENT DOCUMENTS

| | | | | |
|---|---|---|---|---|
| 7,548,626 | B2* | 6/2009 | Stenberg et al. | ............... 381/113 |
| 8,666,095 | B2* | 3/2014 | Hanzlik et al. | ................ 381/111 |
| 2006/0008097 | A1 | 1/2006 | Stenberg | |
| 2009/0279719 | A1 | 11/2009 | Lesso | |
| 2010/0246859 | A1 | 9/2010 | David et al. | |
| 2011/0150239 | A1 | 6/2011 | Onishi | |
| 2011/0150243 | A1 | 6/2011 | Onishi | |
| 2011/0170714 | A1 | 7/2011 | Hanzlik et al. | |

FOREIGN PATENT DOCUMENTS

| | | |
|---|---|---|
| CN | 1741685 | 3/2006 |
| CN | 101640829 | 2/2010 |
| CN | 102301741 | 6/2011 |

OTHER PUBLICATIONS

M. D. Seeman and S. R. Sanders, "Analysis and Optimization of Switched-Capacitor DC-DC Converters", Proc. IEEE Comput. Power Electron. Workshop, pp. 216-224, 2006.*

* cited by examiner

*Primary Examiner* — Duc Nguyen
*Assistant Examiner* — Kile Blair
(74) *Attorney, Agent, or Firm* — Maryam Imam; IPxLAW Group LLP

(57) ABSTRACT

The present invention relates to a DC bias voltage circuit comprising a DC bias voltage generator adapted to supply a first DC voltage. A low-pass filter has an input operatively coupled to the first DC voltage to produce a second DC voltage at a low-pass filter output. The low-pass filter comprises an adjustable switched capacitor resistor setting a cut-off frequency of the low-pass filter and a controller is adapted to controlling a resistance of the adjustable switched capacitor resistor.

21 Claims, 2 Drawing Sheets

FAST POWER-UP BIAS VOLTAGE CIRCUIT

BACKGROUND OF THE INVENTION

DC bias voltage circuits are well-known and utilized in a variety of applications to supply a desired DC voltage to an electronic circuit or to a transducer such as a capacitive microphone. In many of these applications, the desired DC voltage is required to possess a very low noise level to prevent that noise from being injected into signals generated by the electronic circuit or the transducer. The noise of the DC bias voltage circuit can include thermal noise and/or voltage ripple or clock signal residues of a DC-DC converter or charge pump forming part of the DC bias voltage circuit. DC-DC converters or charge pumps are often required to generate an appropriate electrical DC bias voltage to a capacitive transducer from a power supply source. The DC bias voltage is required in order to appropriately convert audible sound, or infrasonic or ultra-sonic sound, into a corresponding electrical signal. In particular, in order to guarantee a level of performance sufficient for common capacitive microphone applications, a high DC voltage is often required for example between 4 V and 20 V.

To reduce the noise level at the output of the DC bias voltage circuit low-pass filters have been used in the prior art where a RC based low-pass filter have been coupled to an output of a charge pump stage to attenuate noise at the output thereof. However, in order for the low-pass filtering to be effective the filter must have a very low cut-off frequency for example below 10 Hz. Such low cut-off frequencies inherently create a long power-up time for the DC bias voltage circuit due to the settling time of the low-pass filter being substantially inversely proportional to the cut-off frequency. Furthermore, to produce such a low cut-off frequency, the filter resistor must have a resistance of extremely high value for example a value above several G$\Omega$ or even tens of G$\Omega$. Unfortunately, it is not possible, in integrated-circuit technology, to obtain resistors with such high resistance values without an unacceptable area consumption of the semiconductor substrate or die. This short-coming has been addressed in the prior art by replacing the high value resistor with non-linear devices, for example a pair of diodes in anti-parallel configuration, capable of providing the high values of resistance required within acceptable die area constraints. However, the actual resistance or impedance values realized by such non-linear devices tend to vary widely across operational temperature, semiconductor process outcome and bias conditions. Consequently, the power-up time of the DC bias voltage circuit becomes ill-defined which makes it difficult during manufacturing testing to estimate the point in time where the circuit under test has reached settled or nominal operation. Likewise, powering-up time becomes uncertain when normal operation is required.

In addition, the long settling time of the low-pass filter causes an undesirable prolongation of manufacturing test time during manufacturing testing of the DC bias voltage circuit, or manufacturing test of a condenser microphone assembly incorporating the DC bias voltage circuit as the bias voltage source of a condenser element. The performance characteristics of the DC bias voltage circuit or the performance characteristics of the condenser microphone assembly, such as electroacoustic sensitivity and noise level, can only be appropriately measured after the DC output voltage of the DC bias voltage circuit is settled. This is because microphone sensitivity is determined by the DC voltage across the condenser element, typically comprising a deflectable diaphragm structure and stationary back plate structure, of the condenser microphone assembly. Hence quick and accurate settling of the DC bias voltage across the condenser microphone element upon power-up will allow tighter sensitivity specifications which are useful in numerous applications such as beamforming applications where tightly matched condenser microphone pairs, triplets etc. are used to provide fixed or adaptive directionality of sound pick-up.

U.S. 2010/0246859 describes a biasing circuit for an acoustic transducer. The biasing circuit is provided with actuable switches so as to connect a first terminal of an acoustic transducer to the biasing terminal of the voltage-booster stage, directly during a start-up step of the biasing circuit, and through filtering elements at the end of the start-up step.

Accordingly, there is a need in the art for the DC bias voltage circuits that are capable of rapid power-up without sacrificing noise performance during normal operation. Further advantages are provided if the DC bias voltage circuit also provides a well-defined power-up time across semiconductor process variations, operational temperature variations and can be implemented in integrated circuit technology with small die area consumption. The latter consideration is particularly important for cost sensitive applications like high-volume low-cost components for electronic consumer products such as miniature ECM and MEMS microphone assemblies for portable communication devices.

SUMMARY OF THE INVENTION

A first aspect of invention relates to a DC bias voltage circuit comprising:
  a DC bias voltage generator adapted to supply a first DC voltage and a low-pass filter having an input operatively coupled to the first DC voltage to produce a second DC voltage at a low-pass filter output. The low-pass filter comprises an adjustable switched capacitor resistor setting a cut-off frequency of the low-pass filter. A controller is controlling a resistance of the adjustable switched capacitor resistor.

The low-pass filter can ensure effective suppression of both white noise and voltage ripple emanating from the first DC voltage by choosing an appropriate setting of the cut-off frequency. In this manner, the second DC voltage may provide a low-noise DC supply voltage for an electronic circuit or a transducer coupled thereto. The DC bias voltage generator may be adapted to step-up or step-down (often called boost and buck operation, respectively) a DC voltage from an external power supply source or step-up or step-down a DC voltage provided by an external or internal reference voltage generator. The external power supply source may comprise one or more rechargeable battery cells or a DC supply rail of a portable communication device. In bias voltage source applications for condenser microphones, the DC bias voltage generator is preferably adapted to step-up or boost the DC voltage from the external or internal voltage supply source for example with a multiplication or boosting factor between 2 and 10 such as between 4 and 5. The DC bias voltage generator may comprise a capacitor based or inductor based voltage boosting circuit such as a charge pump or a boost type DC-DC converter of inverting or non-inverting topology depending on polarity and other characteristics of the external or internal power supply source. In portable communication devices, the external power supply source may for example provide a positive DC voltage between 1.5 V and 2.0 V while a larger DC bias voltage is required for appropriately DC biasing a MEMS condenser microphone coupled to the second DC voltage at the low-pass filter output of the circuit. The MEMS condenser microphone may need a bias voltage of above 10 V, such as between 10 V and 20 V, such that a multiplication or boosting factor in the above-mentioned range is required.

In accordance with the present invention, the low-pass filter comprises an adjustable switched capacitor resistor that determines the cut-off frequency of the low-pass filter. Generally, the low-pass filter may comprise a capacitor based or inductor based setting of the cut-off frequency in combination with the adjustable switched capacitor resistor. The low-pass filter preferably comprises a filter capacitor coupled between the switched capacitor resistor and a signal ground node such that the RC product of this filter capacitor and the adjustable switched capacitor resistor determines the cut-off frequency. The latter embodiment is particularly well-suited for integrated circuit implementation of the present DC bias voltage circuit because capacitor are readily available in integrated circuit technology and capacitor ratios can furthermore be very accurately controlled. This leads to a highly accurate setting of the cut-off frequency of the low-pass filter largely depending exclusively on a clock signal frequency of a pair of non-overlapping clock signals driving the switched capacitor resistor with a resistance, R, in accordance with the equation:

$$R = \frac{1}{C_1 * f_{clk}}$$

$f_{clk}$=clock signal frequency;
$C_1$=value of switch capacitor of the adjustable switched capacitor resistor.

The controller can control the resistance of the switched capacitor resistor, and thereby the cut-off frequency of the low-pass filter, in a highly accurate manner by adjusting the clock signal frequency. The clock signal frequency may for example be adjusted between multiple different preset clock frequencies depending on certain operational states of the present DC bias voltage circuit.

Because very accurate clock signals are readily available in many types of digitally controlled applications of the present DC bias voltage circuit, the cut-off frequency of the low-pass filter can be accurately adjusted by the controller to a desired or target value by adjusting the clock signal frequency. In particular, the controller may be configured to set the clock signal frequency to a first predetermined frequency in a first state of the DC bias voltage circuit and set the clock signal frequency to a second predetermined frequency in a second state of the DC bias voltage circuit. The first state may comprise a power-up or start-up state of the DC bias voltage circuit. The second state may comprise a normal operational state of the DC bias voltage circuit, i.e. at a state where the second DC voltage at the low-pass filter output is settled within the nominal DC voltage limits. The first predetermined frequency is preferably larger than the second predetermined frequency for example between 10 and 1000 times larger or higher such as between 20 and 50 times larger. In the latter embodiment, the present DC bias voltage circuit is capable of rapidly powering-up due to the short or low settling-time of the low-pass filter at the first predetermined frequency of the clock signal without sacrificing noise performance during normal operation. In normal operation, where the clock signal is set to the second predetermined frequency, the cut-off frequency of the low-pass filter is much lower, e.g. between 20 and 50 times lower, so as to achieve superior noise suppression. In second state, the cut-off frequency of the low-pass filter is preferably set to a value below 10 Hz, or even more preferably below 2 Hz, or below 1 Hz. In absolute values, the first predetermined frequency of the clock signal may be set to a value between 300 kHz and 10 MHz, such as between 600 kHz and 2 MHz, and the second predetermined frequency of the clock signal to a smaller value in accordance with the above-mentioned factor range leading to a correspondingly lower cut-off frequency of the switched capacitor low-pass filter formed by the adjustable switched capacitor resistor and the filter capacitor.

In short, the settling time requirements of the DC bias voltage circuit, or the condenser microphone assembly, i.e. system, incorporating the DC bias voltage circuit, may be used to determine a setting of the first predetermined low-pass filter cutoff frequency during power-up. The target or desired noise performance of the DC bias voltage circuit during normal operation, after power-up, may be used to determine or set the second predetermined cutoff frequency.

The capacitance of the switched capacitor may vary depending on the specific embodiment of the present DC bias voltage circuit, but may have a value between 10 fF ($10*10^{-15}$ F) and 1000 fF ($10^{-12}$ F=1 pF) such as about 100 fF ($100*10^{-15}$ F). The low-pass filter may comprise just a single switched capacitor resistor forming a first order lowpass filter as shown in the below-described embodiment with reference to FIG. 1. In another embodiment, the low-pass filter comprises a $2^{nd}$ order or higher order low-pass filter. In this embodiment, the low-pass filter may comprise a plurality of adjustable switched capacitor resistors setting at least a cut-off frequency of the low-pass filter. The plurality of adjustable switched capacitor resistors may also be used to set a quality factor of the low-pass filter.

In yet another embodiment of the invention, the low-pass filter comprises a plurality of cascaded adjustable switched capacitor resistors with an input of the cascade operatively coupled to the first DC voltage to further reduce the low-pass filter cutoff frequency for a given total capacitance of the switched capacitors. A filter capacitor is preferably coupled to the second DC voltage at the low-pass filter output for example between the low-pass filter output and ground or a DC reference voltage. This filter capacitor is un-switched or static. The controller is preferably adapted to controlling a resistance of each of the cascaded adjustable switched capacitor resistors. In this embodiment, the plurality of cascaded adjustable switched capacitor resistors preferably comprises between 5 and 15 switched capacitor resistors.

The controller may be adapted to control the switching between the first and second states of the DC bias voltage circuit in various ways. In one embodiment, the controller detects or monitors a level of the second DC voltage and compares the instantaneous level to some predetermined criteria, e.g. a threshold voltage, to determine the appropriate moment in time to switch from the first to the second state. According to this embodiment, the DC bias voltage circuit preferably comprises a comparator having a first input coupled to the second DC voltage and a second input coupled to a preset threshold voltage. An output of the comparator is preferably coupled to the controller which is configured to switch between first and second states of the DC bias voltage circuit based on the comparator output. The comparator may comprise an operational amplifier with inverting and non-inverting inputs forming the respective comparator inputs. The preset threshold voltage preferably corresponds approximately to the desired level of the second DC voltage in a fully settled state of the DC bias voltage circuit, or possibly a level slightly below the desired level of the second DC voltage to take manufacturing and/or temperature variations into account.

In another embodiment, the controller is adapted to control the switching between the first and second states of the DC bias voltage circuit based on elapse of a predetermined time period from a specific signal event. A counter is utilized in one such embodiment to determine the duration of the predetermined time period from power-on of the DC bias voltage circuit. According to the latter embodiment, the DC bias voltage circuit comprises a counter operatively coupled to the controllable clock generator for receipt of the clock signal. The controller being configured to switch between the first and second states of the DC bias voltage circuit based on a counter output. The counter may be adapted to initialize and start counting upon receipt of a power-on-reset signal provided by a dedicated circuit block for this purpose. The counter may further be adapted to initialize and start counting upon receipt of a signal indicating exit from a standby mode if the DC bias voltage circuit comprises such a standby mode. Given that the time constant of the switched capacitor low-pass filter may be accurately set as a ratio between the filter capacitor and the switched capacitor the controller can use the counter to count the necessary number of clock cycles of the clock signal to achieve a desired settling accuracy of the second DC voltage at the low-pass filter output. In this embodiment, the terminal count needed to achieve a desired level of accuracy of the second DC voltage is independent of $f_{clk}$ because the actual time to reach the specified target or terminal count (Count/f↓clk) scales by the same factor as the time constant of the switched capacitor low-pass filter in response to $f_{clk}$ changes.

According to a preferred embodiment of the invention, the DC bias voltage circuit further comprises a semiconductor diode operatively coupled between the first DC voltage and the second DC voltage at the low-pass filter output. The semiconductor diode is preferably adapted to conduct current from the first DC voltage to the second DC voltage such that the semiconductor diode conducts charging current in parallel with the switched capacitor resistance when forward biased. Since semiconductor diodes may be designed with very low resistance in a forward conduction state in integrated circuit technology, the parallel charge path formed by the diode may considerably speed-up the charging of the second DC voltage. Once the second DC voltage reaches a level about one diode drop below the first DC voltage, the semiconductor diode gradually stops conducting and the residual charging is effected through the switched capacitor resistance. The skilled person will understand that additional semiconductor diodes may be placed in series and/or parallel to the semiconductor diode for example to decrease or increase the magnitude of the forward voltage drop.

Another preferred embodiment of the DC bias voltage circuit comprises a microphone preamplifier and a DC bias network coupled to an input of the microphone preamplifier to set a DC operating point of the microphone preamplifier. The microphone preamplifier may comprise a voltage sensitive input section such as a high-impedance differential input stage in an operational amplifier like topology. In another embodiment, the microphone preamplifier is coupled essentially as an integrator with a feedback capacitor coupled between a preamplifier output and the input. The skilled person will notice that the microphone preamplifier comprises a charge amplifier in the latter embodiment.

The exact DC bias input voltage at the microphone preamplifier input is important because it is the DC voltage across a diaphragm and back plate structure of a condenser microphone element that determines microphone sensitivity as explained above. This DC input bias voltage is often fixed by a DC bias network coupled to a predetermined or desired electric potential. A controllable semiconductor switch is preferably coupled across the DC bias network. The controllable semiconductor switch ensures that the input of the microphone preamplifier can be clamped to a well-defined electric potential during the power-up state of the DC bias voltage circuit. This is particularly helpful in connection with microphone preamplifiers for condenser microphones which require extremely high input impedance of the microphone preamplifier and its associated DC bias network to avoid audio signal attenuation. Due to the extremely high input impedance of the microphone preamplifier, the DC bias network is only capable of very weakly pulling the input of the microphone preamplifier to the desired electric potential or DC input bias voltage, such as ground or a DC reference voltage, during power-up of the DC bias voltage circuit. Because the second DC voltage applied to the condenser microphone element is coupled to the input of the microphone preamplifier via the condenser element capacitance, a quickly rising magnitude of the second DC voltage (at the low-pass filter output) pulls the input of the microphone preamplifier away from its desired DC input bias voltage. The present embodiment eliminates this problem by a low on-resistance or conduction resistance of the controllable semiconductor switch, e.g. less than 10 kΩ or less than 1 kΩ. The low on-resistance effectively clamps the input of the microphone preamplifier to the desired electric potential. To achieve this effect, the controller is preferably adapted to:

in the first state of the DC bias voltage circuit, set the controllable semiconductor switch to a conducting state; and in the second state of the DC bias voltage circuit, set the controllable semiconductor switch to a non-conducting state. Hence, the input of the microphone preamplifier is effectively clamped to the desired electric potential during power-up of the DC bias voltage circuit. When the controller switches to the second state, it sets the controllable semiconductor switch to the non-conducting state to remove the bypassing or short-circuiting of the DC bias network such that normal operation of the microphone preamplifier and associated DC bias network is resumed.

A second aspect of the invention relates to a method of powering-up a DC bias voltage circuit comprising steps of:
generating a first DC voltage from an input voltage source,
applying a clock signal with a first predetermined frequency to a switched capacitor resistor of a low-pass filter in a power-up state of the DC bias voltage circuit,
low-pass filtering the first DC voltage to generate a second DC voltage at an output of the low-pass filter,
charging the second DC voltage through the low-pass filter until a predetermined charging criteria is matched,
adjusting the clock signal to a second predetermined frequency in a normal operation state of the DC bias voltage circuit. The first predetermined frequency is higher than the second predetermined frequency.

As mentioned above, the first predetermined frequency of the clock signal is preferably larger than the second predetermined frequency for example between 10 and 1000 times higher such as between 20 and 50 times higher. The present DC bias voltage circuit is capable of rapidly powering-up due to the small or low settling-time of the low-pass filter at the first predetermined frequency of the clock signal. By switching the clock signal to the second predetermined frequency when entering the normal operation state, noise components on the first DC voltage are effectively suppressed by the lower cut-off frequency of the low-pass filter. In this manner the present power-up methodology facilitates rapid power-up of the present DC bias voltage circuit without sacrificing noise performance during normal operation.

The first and second states of the DC bias voltage circuit are in one embodiment detected by comparing the second DC voltage to a preset threshold voltage. As mentioned above, the preset threshold voltage may correspond approximately to the desired level or nominal level of the second DC voltage in a fully settled state of the DC bias voltage circuit, or possibly a level slightly below the nominal level of the second DC voltage to take manufacturing and/or temperature variations into account.

Another aspect of the invention relates to semiconductor die or substrate comprising an integrated DC bias voltage circuit according to any of the above described embodiments thereof. The semiconductor die is preferably fabricated by a sub-micron CMOS semiconductor process to allow large scale manufacturing at very low manufacturing costs per unit/die. As mentioned above, the present low-pass filter is particularly well-suited for integrated circuit implementation because the switched capacitor resistor can be fabricated with small die area consumption. In addition, the cut-off frequency of the low-pass filter can be set very accurately by a capacitor ratio as mentioned above.

Yet another aspect of the invention relates to a capacitive or condenser microphone assembly comprising:

capacitive transducer element having a back plate and a diaphragm arranged in a spaced relationship thereto, the diaphragm being displaceable relative to the back plate in response to sound;

a DC bias voltage circuit according to any of the above described embodiments thereof is coupled to the capacitive transducer element such that either the diaphragm or the back plate is electrically coupled to the second DC voltage to provide a DC bias voltage for the capacitive transducer element. In this manner, the second DC voltage of DC bias voltage circuit provides a low-noise DC bias voltage for the capacitive transducer element. The condenser microphone assembly may comprise a miniature MEMS condenser capsule enclosing the back plate and diaphragm structures and be mounted on a suitable carrier or substrate for the assembly. In one embodiment, the miniature MEMS condenser capsule may be integrated on a common semiconductor die or substrate with a DC bias voltage circuit according to any of the above described embodiments thereof to provide a single die MEMS condenser microphone assembly.

BRIEF DESCRIPTION OF THE DRAWINGS

Embodiments of the invention will be described in more detail in connection with the append drawing in which.

DESCRIPTION OF PREFERRED EMBODIMENTS

Figure 1:
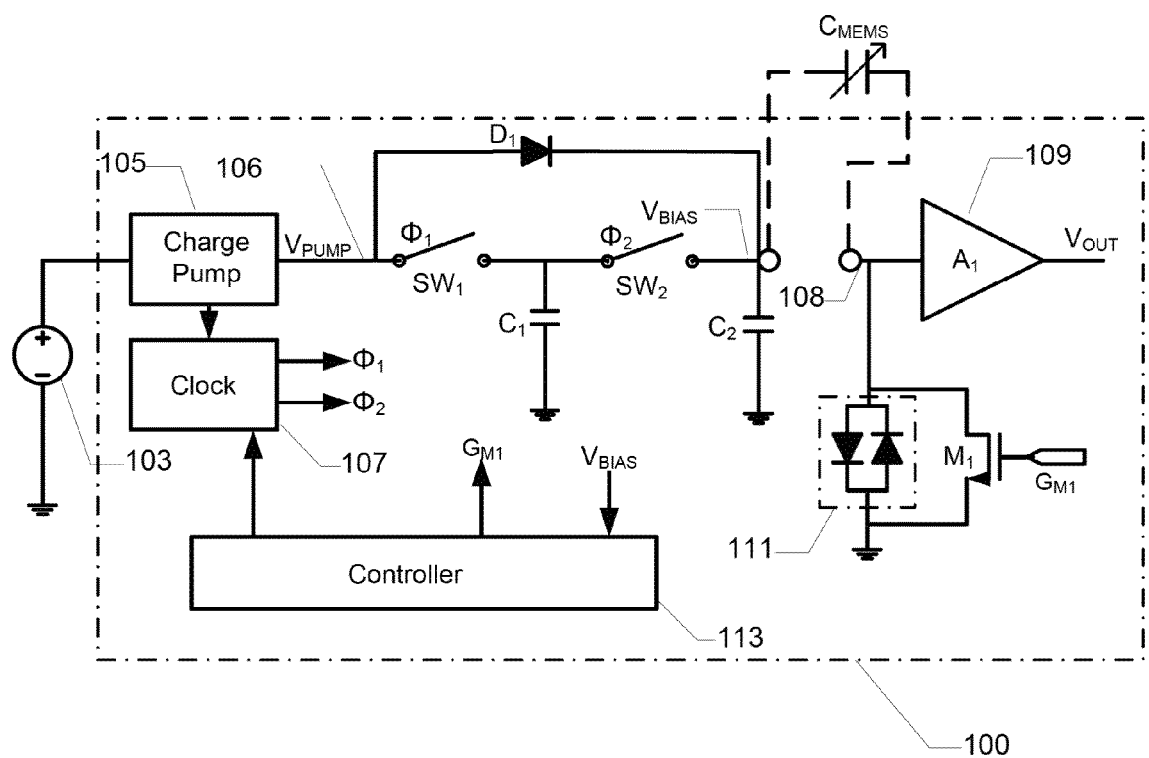
FIG. 1 is a simplified schematic circuit diagram of a DC bias voltage circuit according to a first embodiment of the invention coupled to a MEMS condenser microphone.

FIG. 1 is a simplified schematic circuit diagram of a DC bias voltage circuit 100 according to a first embodiment of the invention. The DC bias voltage circuit 100 is integrated on a semiconductor substrate in the present embodiment and may conveniently be manufactured in a sub-micron CMOS process. The DC bias voltage circuit 100 is electrically coupled to opposing diaphragm and back plate structures of a MEMS condenser microphone $C_{MEMS}$ through a pair of pads arranged on the surface of the semiconductor substrate. The MEMS condenser microphone $C_{MEMS}$ is schematically depicted as a variable capacitor illustrating its change of capacitance in response to impinging sound.

The DC bias voltage circuit 100 receives input power and voltage from an external power supply source 103. This external power supply source 103 may be a DC supply rail of a portable communication device such as a mobile phone. The external power supply source 103 may provide a DC voltage between 1.5 V and 2.0 V while a larger bias voltage is required for appropriately biasing the MEMS condenser microphone $C_{MEMS}$. In the present embodiment, the MEMS condenser microphone may need a DC bias voltage of about 4-12 V, but the skilled person will understand that other condenser microphone designs may need different bias voltages. The DC bias voltage circuit 100 comprises a DC bias voltage generator in form of a charge pump 105 operatively coupled to the external power supply source 103. A reference voltage generator (not shown) supplied with power by the external power supply 103 is preferably used to generate an accurate and long-term stable DC input voltage for the charge pump 105. The reference voltage generator may comprise a bandgap based voltage generator. The charge pump 105 uses a cascade of pump stages with respective pump capacitors to multiply the above-mentioned stable DC input voltage with a factor necessary to generate a desired voltage of $V_{PUMP}$. In this manner, a DC voltage at $V_{PUMP}$, between 8 and 12 V for example may be generated at the output node 106 of the charge pump 105. The skilled person will appreciate that the charge pump 105 could be adapted to generate different values of $V_{PUMP}$ in other embodiments of the invention and/or could be an inverting type accepting a negative DC voltage from the external power supply source 103 or from the reference voltage generator while still producing a positive DC output voltage. The DC voltage $V_{PUMP}$ is applied to a switched capacitor low-pass filter comprising switch capacitor $C_1$, first and second semiconductor switches $SW_1$, $SW_2$, respectively, and an un-switched or static filter capacitor $C_2$. The switched capacitor low-pass filter is preferably adjusted such that it has a cut-off frequency or corner frequency below 10 Hz in a second state or normal operation mode of the DC bias voltage circuit 100 as explained in additional detail below. A DC output voltage $V_{BIAS}$ provided at the output of the switched capacitor low-pass filter. This DC output voltage $V_{BIAS}$ has a significantly reduced level of noise compared to the $V_{PUMP}$ voltage due to the effective suppression of both white noise and voltage ripple provided by the switched capacitor low-pass filter. A single switched capacitor low-pass filter is depicted on FIG. 1 in the present embodiment of the invention. The skilled person will appreciate that other embodiments may comprise a plurality of cascaded switched capacitor resistors instead of the illustrated single switched capacitor resistor.

The DC voltage $V_{BIAS}$ is supplied to either a diaphragm or a back plate electrode of the MEMS condenser microphone through the previously mentioned first pad on the semiconductor substrate. The opposite electrode of the MEMS condenser microphone is electrically coupled to an input 108 of a microphone preamplifier 109 through another pad on the semiconductor substrate such that an AC microphone signal generated by relative displacement between the diaphragm and back plate electrodes in response to sound is amplified. The amplified microphone signal is provided at an output $V_{OUT}$ of the microphone preamplifier. A DC bias network 111, comprising a pair of anti-parallel semiconductor diodes, is coupled to the input 108 of the microphone preamplifier 109 to set a DC bias or operating point of the microphone preamplifier 109. In the present embodiment, the DC bias network 111 sets the input 108 of the microphone preamplifier 109 to approximately ground level but in other embodiments the input of 108 may naturally be set to different electric potentials such as a positive or negative DC reference voltage depending on the chosen circuit topology of the microphone preamplifier 109. A semiconductor switch comprises a NMOS transistor M, that is coupled across the DC bias network 111 allowing the latter to be essentially bypassed in the power-up state of the DC bias voltage circuit 100 by controlling the signal level at the gate terminal $G_{M1}$, of the NMOS transistor $M_1$ such that it is switched to a conducting state or on-state.

The first and second semiconductor switches $SW_1$, $SW_2$, respectively, of the switched capacitor low-pass filter are clocked by non-overlapping clock signals $\phi_1$, $\phi_2$ of appropriate amplitude to switch each semiconductor switch between conducting and non-conducting modes. The non-overlapping clock signals are generated by a clock circuit 107 which in turn is controlled by a controller 113 or control logic. The amplitude of the non-overlapping clock signals $\phi_1$, $\phi_2$ is adjusted in accordance with the voltage level at $V_{PUMP}$ to ensure that each of the first and second semiconductor switches $SW_1$, $SW_2$, respectively, can be appropriately opened and closed (switched between non-conducting and conducting states). A resistance of the switched capacitor resistor formed by the switch capacitor $C_1$, and the first and second semiconductor switches $SW_1$, $SW_2$, respectively, can be adjusted by the controller 113 by adjusting the frequency of the non-overlapping clock signals $\phi_1$, $\phi_2$ since the resistance, R, can be written as:

$$R = \frac{1}{C_1 * f_{clk}}$$

$f_{clk}$=Frequency of the non-overlapping clock signals $\phi_1$, $\phi_2$.

Consequently, the cut-off frequency of the switched capacitor low-pass filter is adjusted as well by adjusting the frequency of the clock signals $\phi_1$, $\phi_2$. The capacitance of the switch capacitor $C_1$ may lie between 10 fF and 1000 fF. The frequency of the clock signals $\phi_1$, $\phi_2$ or clock frequency may be set to a value between 1 and 10 MHz during the first state of the DC bias voltage circuit 100 which may correspond to a power-up state or initialization state. In the second state of the DC bias voltage circuit 100, the clock frequency is preferably set to value that is between 10 and 100 times smaller than the clock frequency in the first state leading to a correspondingly lower cut-off frequency of the switched capacitor low-pass filter.

The controller 113 controls the power-up sequence of the DC bias voltage circuit 100 and ensures appropriate state switching based on duration of a predetermined time period. A counter (not shown) is preferably utilized to set or determine the duration of the predetermined time period from a power-on event of the DC bias voltage circuit. The power-on event may be indicated to the counter by an external power-on signal generated by either powering up of the MEMS condenser microphone or by another system signal that indicates the DC output voltage $V_{BIAS}$ is needed. The power-on signal can for example be a logical OR of a power-on-reset signal (detecting presence of a power supply voltage VDD) and of a standby exit signal. Such a standby exit signal could be for example come from a clock detector that detects the resumption of the system clock, i.e. resumption of operation from a standby (reduced power) mode where the charge pump 105 is powered off. The counter may be adapted to initialize and start counting upon receipt of the power-on signal. The counter may further be adapted to initialize and start counting upon receipt of a signal indicating exit from a standby mode if the DC bias voltage circuit comprises such a standby mode. The counter is operatively coupled to the controllable clock generator 107 for receipt of the clock signal. The controller 113 is configured to switch from the first to the second state of the DC bias voltage circuit 100 based on a counter output or value. As the time constant of the switched capacitor low-pass filter may be accurately set as a ratio between the filter capacitor $C_2$ and the switch capacitor $C_1$ the controller 113 can use the counter to count the necessary number of clock cycles of the clock signal to achieve a desired settling accuracy of at $V_{PUMP}$ at the low-pass filter output. In this embodiment, the terminal count needed to achieve a desired level of accuracy of at $V_{PUMP}$ is independent of $f_{clk}$ because the actual time to reach the specified target or terminal count (Count/f↓clk) scales by the same factor as the time constant of the switched capacitor low-pass filter in response to $f_{clk}$ changes.

When the controller 113 detects that the count held by the counter is less than the specified target or terminal count, the DC bias voltage circuit 100 is powering-up. In response to this determination, the controller 113 sets the clock frequency of the clock signals $\phi_1$, $\phi_2$ to the previously discussed high value e.g. about 2 MHz whereby the cut-off frequency of the switched capacitor low-pass filter is set to a high frequency. This setting of clock signal frequency dramatically speed-up the settling of the output voltage of the switched capacitor low-pass filter. This leads to a rapidly increasing $V_{BIAS}$ voltage such that the bias voltage for the MEMS condenser microphone reaches its nominal value in a correspondingly fast manner.

When the controller 113 detects the target or terminal count is reached, the DC bias voltage circuit 100 has reached its normal operating state. The controller 113 accordingly decreases the clock frequency of the clock signals $\phi_1$, $\phi_2$ to the previously discussed second predetermined value, e.g. about 100 kHz, or even lower, such that the cut-off frequency of the switched capacitor low-pass filter is set to the lowest frequency, preferably below 10 Hz or even below 2 Hz or 1 Hz. The noise of the charge pump output voltage $V_{PUMP}$ is now efficiently suppressed or attenuated and a low-noise bias voltage supplied to the MEMS condenser microphone. The skilled person will notice that the DC bias voltage circuit 100 very rapidly has been powered-up and reached a normal operational state by virtue of the cut-off frequency switching. The skilled person will appreciate that the microphone sensitivity has reached its nominal or steady state value once the DC voltage across the condenser microphone element is settled at its nominal or final value. This situation requires that both the DC voltage $V_{BIAS}$ at the low-pass filter output is settled and the DC input bias voltage at the microphone preamplifier is settled to its final value. In this latter state or mode of operation, the relevant electroacoustic performance characteristics of the MEMS condenser microphone assembly can be accurately measured and evaluated during manufacturing testing. To facilitate rapid settling of the DC input bias voltage at the microphone preamplifier input during the above-described powering-up of the DC bias voltage circuit 100, the NMOS transistor $M_1$ is preferably set to its conducting state, i.e. On-state, by the controller 113 such that the DC bias network 111 of the microphone preamplifier 109 becomes essentially bypassed by the low on-resistance of the NMOS transistor $M_1$. This may be required because the impedance of the DC bias network 111 is often extremely large, for example tens of GΩ, to avoid loading the high-impedance capacitive transducer element of the MEMS condenser microphone. For this reason, the DC bias network 111 only presents a very weak pulling to the desired DC input bias voltage of the microphone preamplifier 109 such that the charging of the MEMS condenser microphone can pull the operating point at the input of the microphone preamplifier 109 away from the desired DC input bias voltage during power-up. The low on-resistance of the NMOS transistor $M_1$ in its conducting state, compared to the impedance of the DC bias network 111, ensures that the input node 108 of the microphone preamplifier 109 is effectively clamped to the desired electric potential during power-up. Once, the controller 113 detects that powering-up is complete as described above, the controller 113 switches the NMOS transistor $M_1$ to its non-conducting or off-state whereby normal operation of the DC bias network 111 is resumed.

The DC bias voltage circuit 100 comprises an optional semiconductor diode $D_1$ which further accelerates the powering-up of the circuit for a certain period of time. The semiconductor diode $D_1$ is coupled between the charge pump output voltage $V_{PUMP}$ and the DC voltage $V_{BIAS}$ such it conducts current from $V_{PUMP}$ to $V_{BIAS}$ in parallel with the switched capacitor resistance as long as $D_1$ is forward biased. Since the diode $D_1$ may be designed to exhibit a very low resistance in forward conduction, the parallel bias voltage charge path may considerably speed-up the charging of $V_{BIAS}$. Once the bias voltage on $V_{BIAS}$ reaches a level about one diode drop below the charge pump output voltage $V_{PUMP}$, $D_1$ gradually stops conducting and the residual charging of $V_{BIAS}$ is effected through the switched capacitor resistance until the voltage level on $V_{BIAS}$ is substantially equal to the charge pump output voltage $V_{PUMP}$.

Figure 2A:
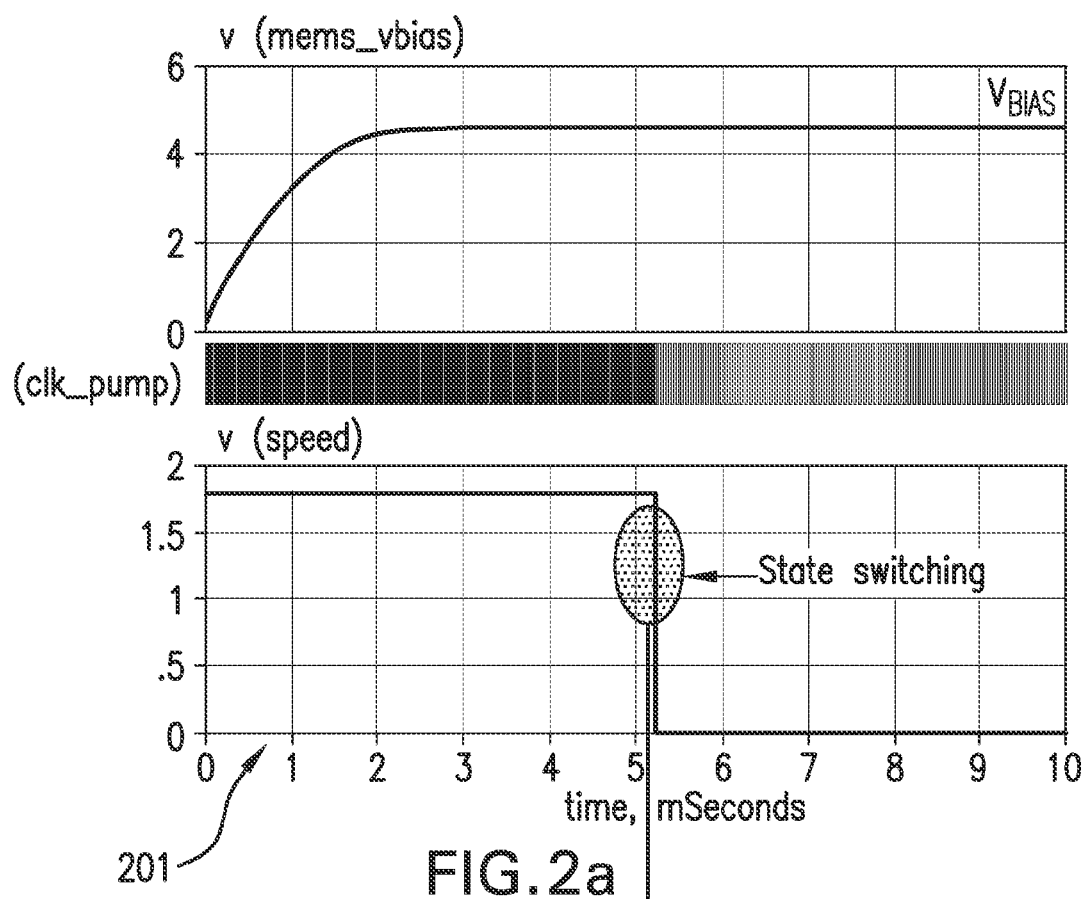
FIGS. 2a) and 2b) are signal plots from an integrated prototype DC bias voltage circuit according to the first embodiment of the invention.

The plot 201 of FIG. 2*a*) depicts three different measured signal waveforms of the DC bias voltage circuit 100 during power-up. The plot marked $V_{BIAS}$ is a measured waveform of the DC voltage at the switched capacitor low-pass filter output versus time. The lower plot marked "clk_pump", shows the measured corresponding clock frequency signal generated by the clock circuit 107. The clock signal waveform is blurred due to the high frequency of the clock signal relative to the time scale on FIG. 2*a*) which depicts elapsed in time in milliseconds. The depicted clock frequency signal drives the non-overlapping clock signals $\phi_1$, $\phi_2$ for the first and second semiconductor switches $SW_1$, $SW_2$, respectively, of the switched capacitor resistance as described above. The signal waveform marked "v(speed)" illustrates the logic state of a control signal of the controller indicating the current state of the DC bias voltage circuit, i.e. the power-up/start-up state or normal operation. This control signal is used by the controller to determine when the clock signal is to be switched from the first predetermined frequency to the second predetermined frequency. As illustrated, the control signal "v(speed)" switches logic state from high to low at approximately 5.20 milliseconds indicating the shift from the the power-up state to the state of normal operation. In the present plot, the first predetermined frequency was set to 384 kHz and the second predetermined frequency to 48 kHz. The rapid power-up capability of the present DC bias voltage circuit 100 is clearly demonstrated by the rapid increase of the DC voltage on $V_{BIAS}$ at the switched capacitor low-pass filter output towards its final or steady-state value of about 4.5 V where the steady-state voltage is nearly reached already after about 3.0 milliseconds.

Figure 2B:
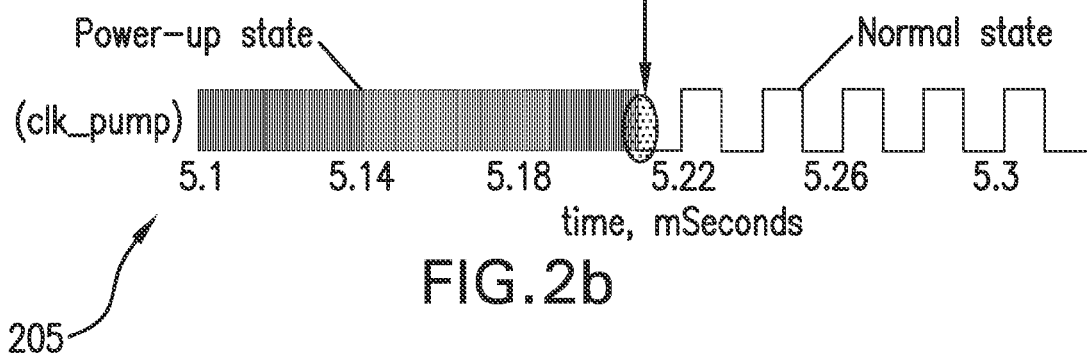

FIG. 2*b*) shows a plot of the clock frequency signal "clk_pump" depicted above on an expanded time scale running from about 5.10 milliseconds to 5.30 milliseconds. As clearly illustrated on this plot, the abrupt shift of clock frequency from the first to the second predetermined frequency is effected by the controller at approximately 5.20 milliseconds in response to the switch of logic state of the control signal "v(speed)".

The invention claimed is:

1. A DC bias voltage circuit comprising:
   a DC bias voltage generator adapted to supply a first DC voltage (Vpump);
   a low-pass filter having an input operatively coupled to the first DC voltage to produce a second DC voltage at a low-pass filter output, the low-pass filter having an adjustable switched capacitor resistor operable to set a cut-off frequency of the low-pass filter, the cut-off frequency of the low-pass filter being adjusted in accordance with a first and a second state, the first state being power-on and the second state being normal operation; and
   a controller controlling a resistance of the adjustable switched capacitor resistor,
   wherein during the first state, the low-pass filter output does not exceed the Vpump and during the second state, the low-pass filter output is substantially the same as the Vpump.

2. The DC bias voltage circuit according to claim 1, wherein the low-pass filter comprises a filter capacitor coupled to the adjustable switched capacitor resistor and the low-pass filter output.

3. The DC bias voltage circuit according to claim 1, further comprising:
   a controllable clock generator adapted to generate the clock signal and wherein the controller is configured to:
      set the clock signal frequency to a first predetermined frequency in a first state of the DC bias voltage circuit; and
      set the clock signal frequency to a second predetermined frequency in a second state of the DC bias voltage circuit.

4. The DC bias voltage circuit according to claim 3, further comprising:
   a comparator having a first input coupled to the second DC voltage, a second input coupled to a preset threshold voltage and an output coupled to the controller, the controller being configured to switch between the first and second states of the DC bias voltage circuit based on the comparator output.

5. The DC bias voltage circuit according to claim 3, further comprising:
   a counter operatively coupled to the controllable clock generator for receipt of the clock signal, the controller being configured to switch between the first and second states of the DC bias voltage circuit based on a counter output.

6. The DC bias voltage circuit according to claim 3, wherein the first predetermined frequency is between 10 and 1000 times higher than the second predetermined frequency.

7. The DC bias voltage circuit according to claim 3, wherein the first state of the DC bias voltage circuit comprises a power-up state and the second state comprises a normal operational state.

8. The DC bias voltage circuit according to claim 1, further comprising a semiconductor diode operatively coupled between the first DC voltage and the second DC voltage at the low-pass filter output.

9. The DC bias voltage circuit according to claim 1, wherein the DC bias voltage generator comprises a charge pump or a boost DC-DC converter with an input operatively coupled to a power supply source for the DC bias voltage circuit.

10. The DC bias voltage circuit according to claim 1, further comprising:
   a microphone preamplifier;
   a DC bias network coupled to an input of the microphone preamplifier to set a DC operating point of the microphone preamplifier; and
   a controllable semiconductor switch coupled across the DC bias network.

11. The DC bias voltage circuit according to claim 10, wherein the controller is further adapted to:
   in the first state of the DC bias voltage circuit, set the controllable semiconductor switch to a conducting state; and
   in the second state of the DC bias voltage circuit, set the controllable semiconductor switch to a non-conducting state.

12. The DC bias voltage circuit according to claim 1, further comprising:
   a plurality of cascaded adjustable switched capacitor resistors with an input of the cascade operatively coupled to the first DC voltage; and
   a filter capacitor coupled to the second DC voltage at the low-pass filter output, the controller controlling a resistance of each of the cascaded adjustable switched capacitor resistors.

13. The DC bias voltage circuit according to claim 1, wherein the low-pass filter comprises a $2^{nd}$ order or higher order low-pass filter and the low-pass filter also comprises a plurality of adjustable switched capacitor resistors setting at least a cut-off frequency of the low-pass filter.

14. A semiconductor die or substrate comprising an integrated DC bias voltage circuit according to claim 1.

15. A capacitive or condenser microphone assembly comprising:
   capacitive transducer element having a back plate and a diaphragm arranged in a spaced relationship thereto, the diaphragm being displaceable relative to the back plate in response to sound;
   a DC bias voltage circuit according to claim 1 coupled to the capacitive transducer element such that either the diaphragm or the back plate is electrically coupled to the second DC voltage to provide a DC bias voltage for the capacitive transducer element.

16. A method of powering-up a DC bias voltage circuit comprising steps of:
   generating a first DC voltage (Vpump) from an input voltage source;
   using a low-pass filter, filtering the first DC voltage to generate a second DC voltage at a low-pass filter output;
   setting a cut-off frequency of the low-pass filter by an adjustable switched capacitor resistor, wherein the cut-off frequency of the low-pass filter is set to a first state during power-on and to a second state during normal operation;
   controlling a resistance of the adjustable switched capacitor resistor, wherein during the first state, the low-pass filter output does not exceed the Vpump and during the second state, the low-pass filter output is substantially the same as the Vpump.

17. The method of powering-up a DC bias voltage circuit according to claim 16, wherein the power-up and normal operation states are detected by comparing the second DC voltage to a preset threshold voltage.

18. The method of powering-up a DC bias voltage circuit according to claim 16, wherein the power-up and normal operation states are detected by comparing a counter output to a predetermined counter value.

19. The method of powering-up a DC bias voltage circuit according to claim 16, further including applying a clock signal with a first predetermined frequency to a switched capacitor resistor of the low-pass filter in a power-up state, charging the second DC voltage through the low-pass filter until a predetermined charging criteria is matched, and adjusting the clock signal to a second predetermined frequency in a normal operation state.

20. The method of powering-up a DC bias voltage circuit according to claim 19, wherein the first predetermined frequency is between 10 and 1000 higher than the second predetermined frequency.

21. A DC bias voltage circuit comprising:
   a DC bias voltage generator adapted to supply a first DC voltage (Vpump);
   a low-pass filter having an input operatively coupled to the first DC voltage to produce a second DC voltage at a low-pass filter output, the low-pass filter having an adjustable cut-off frequency, the adjustable cut-off frequency being adjusted in accordance with a first and a second state, the first state being power-on and the second state being normal operation,
   the low pass filter comprising an adjustable switched capacitor resistor and a capacitor, the adjustable switched capacitor resistor being adjusted to change the cut-off frequency of the low-pass filter; and
   a controller operable to control a resistance of the adjustable switched capacitor resistor, wherein the resistance of the adjustable switched capacitor resistor is adjusted by changing a clock signal frequency applied to the adjustable switched capacitor resistor, further wherein during the first state, the low-pass filter output does not exceed the Vpump and during the second state, the low-pass filter output is substantially the same as the Vpump.

* * * * *